Dec. 23, 1969   M. OFFNER   3,485,398
TENNIS BALL PICK-UP AND COLLECTING MACHINE
Filed Oct. 2, 1967
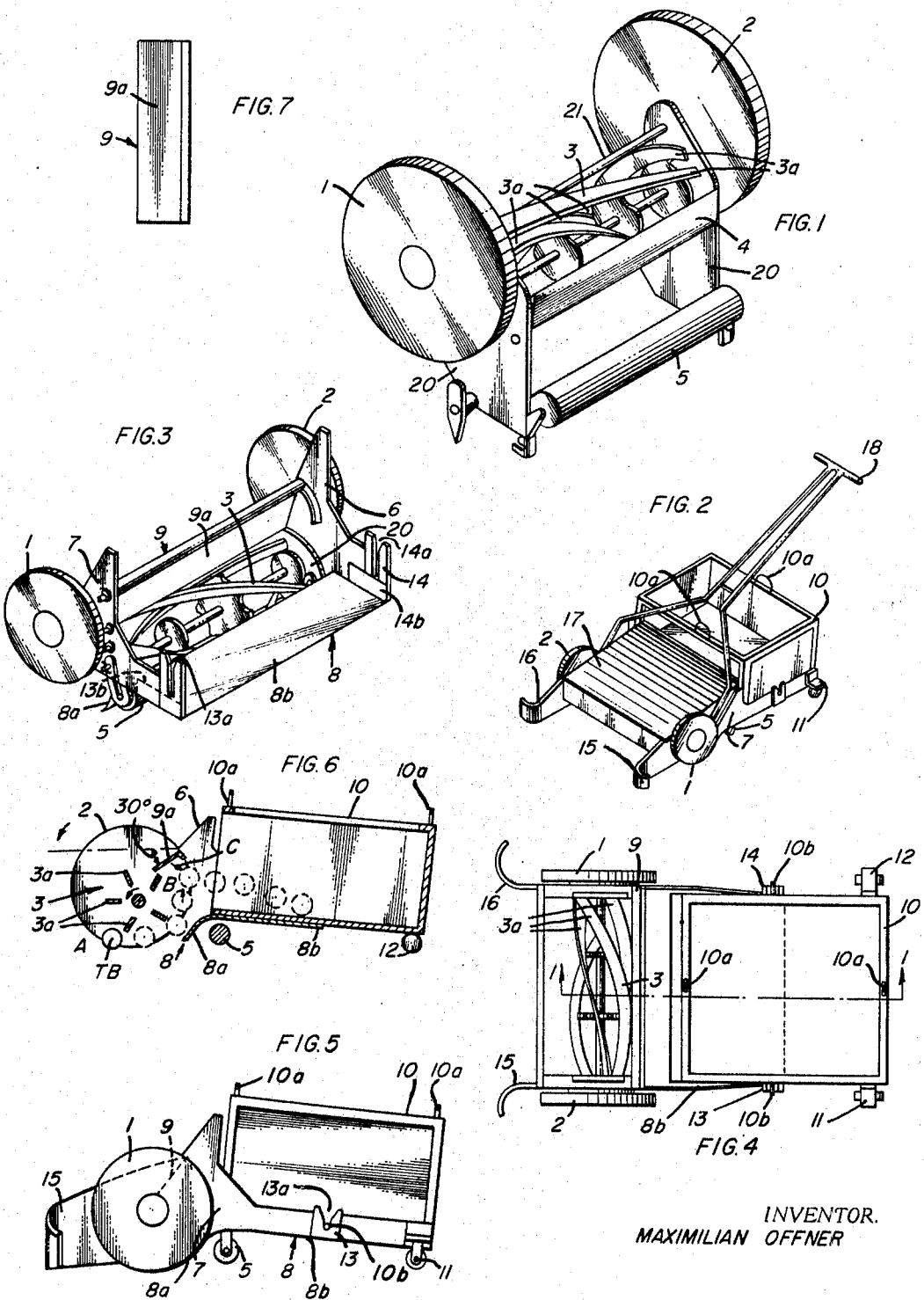
INVENTOR.
MAXIMILIAN OFFNER United States Patent Office 3,485,398
Patented Dec. 23, 1969

3,485,398
TENNIS BALL PICK-UP AND COLLECTING MACHINE
Maximilian Offner, 157 Hemenway St., Apt. 7, Boston, Mass. 02115
Filed Oct. 2, 1967, Ser. No. 672,379
Int. Cl. B60p *1/40;* A63b *61/00*
U.S. Cl. 214—356           3 Claims

ABSTRACT OF THE DISCLOSURE

A tennis ball pick-up and collecting machine. A conventional hand-pushed lawn mower, including side frames, helix reel assembly, wheels, roller, cutter bar, and handle, is modified by removing the cutter bar and replacing it by a tennis ball guide plate. The guide plate includes a front portion located near ground level between the reel assembly and roller, and a rear portion extending from the front portion and over the roller to a rearward location and receiving a tennis ball collecting box thereon. A repeller plate is arranged with respect to a top, rear portion of the reel assembly for intercepting and redirecting the flow of air propelled around the outside of the reel assembly when the reel assembly is caused to rotate.

In operation, when the tennis ball pickup and collecting machine is moved along the ground, the reel assembly rotates, and a tennis ball in front of the reel assembly is swept thereunder by one of the blades thereof and between the reel assembly and the front portion of the guide plate, and then toward the repeller plate. The repeller plate, however, redirects the air carried around the outside of the reel assembly into the path of the ball, causing the ball to be redirected into the collecting box.

BACKGROUND OF THE INVENTION

The present invention relates to a tennis ball pickup and collecting machine and, more particularly, to a tennis ball pickup and collecting machine embodying a modified conventional hand-pushed lawn mower.

The sport of tennis in the United States is currently experiencing a greatly increased popularity. Consequently, with the tremendous increase in the number of persons participating in the sport of tennis, the demand for professional tennis instruction has greatly increased. As a result of this greatly increased demand for professional instruction, the need for a machine or device for picking up and collecting large numbers of tennis balls in a highly efficient and effective manner has become quite apparent. This need is dramatized by the fact that at the present time the average professional tennis instructor picks up, by hand, several hundred tennis balls daily. Obviously, this hand approach of picking up large numbers of tennis balls can be costly and is a waste of time, both for the instructor and his students, contributing nothing to the lessons given to the students or to the general efficiency of the instructor.

Any machine which is to be employed for picking up and collecting large numbers of tennis balls should satisfy certain important criteria. For example, such a machine should not require electricity for its operation (so as to permit use on both indoor and outdoor tennis courts), and should be highly efficient, rugged, long-lasting, and have a reasonable cost. As to the cost criterion, it is readily apparent that if a standard, commercially-available, mass-produced machine could be readily and satisfactorily modified to provide a machine for picking up and collecting tennis balls, the overall cost of developing and producing such a tennis ball pickup and collecting machine could be significantly reduced.

BRIEF SUMMARY OF THE INVENTION

In accordance with the present invention, a tennis ball pickup and collecting machine is provided which embodies, in a modified form, a standard, commercially-available, mass-produced machine, namely, a lawn mower of the helix reel assembly type. Since this type of lawn mower is generally efficient, rugged, and long-lasting, the tennis ball pickup and collecting machine of the present invention, which includes nearly all of the major components of the lawn mower, is likewise efficient, rugged, and long-lasting. In addition, since the lawn mower constitutes a major portion of the tennis ball pickup and collecting machine as will become readily apparent hereinafter, and since the cost of such lawn mower is reasonable, the cost of the tennis ball pickup and collecting machine is also reasonable.

Briefly, in accordance with the present invention, the modified lawn mower includes a pair of side frames, a pair of wheels secured to the ends of a rotatable elongated member such as a shaft which passes through the side frames, a rotatable helix reel assembly positioned between the side frames and including a plurality of helical blades, a roller rotatably mounted at the ends thereof to the side frames, and a means operative to cause the wheels and roller to move along a surface on which tennis balls are lying and to cause a rotation motion to be imparted to the helix reel assembly. The helix reel assembly is positioned above the surface by an amount sufficient to enable a tennis ball present in front of the helix reel assembly to be pushed therebetween in response to the tennis ball being struck by one of the helical blades upon a rotation motion being imparted to the helix reel assembly. The roller, in the usual manner, touches the surface at a point located behind the helix reel assembly.

In addition to the modified lawn mower, the present invention includes a tennis ball guide plate, a repeller plate, and a tennis ball collecting means. The tennis ball guide plate includes a portion positioned near to the surface and between the helix reel assembly and the roller, and spaced from the helix reel assembly by an amount sufficient to enable a tennis ball to pass therebetween after being struck by one of the helical blades of the helix reel assembly. The tennis ball collecting means is located behind the above-mentioned portion of the tennis ball guide plate and has an opening therein which faces a rear portion of the helix reel assembly. The repeller plate is closely positioned near a top, rear portion of the helix reel assembly and is arranged with respect to the helix reel assembly to intercept the flow of air propelled around the helix reel assembly, upon a rotation motion being imparted to the helix reel assembly, and to redirect the air in a direction toward the opening in the tennis ball collecting means.

In operation, when the tennis ball pickup and collecting machine is caused to move along the surface, the helix reel assembly rotates, and a tennis ball present on the surface in front of the helix reel assembly is swept under the reel assembly by one of the blades thereof. As the helix reel assembly continues to rotate, the tennis ball is carried by the helix reel assembly, between the helix reel assembly and the aforesaid portion of the tennis ball guide plate, and is propelled toward the repeller plate. The repeller plate intercepts the flow of air propelled around the helix reel assembly, due to the rotation of the helix reel assembly, and redirects the air into the path of the tennis ball, causing the tennis ball to be directed into the opening in the tennis ball collecting means.

BRIEF DESCRIPTION OF THE DRAWING

FIG. 1 is a perspective view of the main body portion of a conventional lawn mower, the main body portion being shown inverted in FIG. 1 from its usual operating position to more clearly illustrate particular components thereof;

FIG. 2 is a generalized perspective view of a tennis ball pickup and collecting machine in accordance with the present invention;

FIG. 3 is a detailed perspective view of the tennis ball pickup and collecting machine of the invention, various portions thereof being omitted in the showing of FIG. 3 to more clearly illustrate particular details and also to illustrate the manner in which particular components of the main body portion of FIG. 1 are employed in the present invention;

FIGS. 4 and 5 are a top view and side view, respectively, of the tennis ball pickup and collecting machine of the invention, various portions thereof being omitted in the showings of FIGS. 4 and 5 to more clearly illustrate particular details thereof;

FIG. 6 is a cross-sectional view of the tennis ball pickup and collecting machine of the invention, taken along the line 1—1 in FIG. 4; and FIG. 7 is a top view of a repeller plate employed in the tennis ball pickup and collecting machine of the invention.

DETAILED DESCRIPTION OF THE INVENTION

Referring to FIG. 1, there is shown a perspective view of the main body portion of a convention lawn mower. For purposes of illustration only, the main body portion is shown inverted from its usual operating position. In addition, no handle, as would ordinarily be employed, is shown in the figure. As shown in the figure, the main body portion of the conventional lawn mower includes a pair of spaced side frames 20, a pair of wheels 1 and 2 fixed at the ends of a rotatable shaft 21 which passes through the side frames 20, a helix reel assembly 3 positioned between the side frames 20 and having a plurality of helical blades 3a (for example, five), a cutter bar (or knife) 4 affixed at its ends to the side frames 20, and a roller 5 rotatably mounted at the ends thereof to the side frames 20. Since the detailed construction and operation of the above-described components is well known, no additional discussion will be presented here.

The manner in which the main body portion (FIG. 1) of the conventional lawn mower is modified and then embodied in the tennis ball pckup and collecting machine of the present invention is shown in FIGS. 3 through 6. As shown in FIGS. 3, 5, and 6, and particularly FIG. 6, the cutter bar 4 is removed from the main body portion (FIG. 1) and replaced with a tennis ball guide plate 8, typically of sheet metal. The tennis ball guide plate 8 includes a front portion 8a which is disposed near ground level, between the bottom, rear portion of the helix reel assembly 3 and the roller 5, and a rear portion 8b which extends from the front portion 8a at a point just above the roller 5, and continues in a rearward direction.

The rear portion 8b of the tennis ball guide plate 8, as shown in FIGS. 4, 5, and 6, is adapted to receive a removable tennis ball collecting basket 10 having a pair of carrying handles 10a, and a pair of rear wheels 11 and 12, for example, swivel wheels. The tennis ball collecting basket 10, as shown in FIGS. 4 and 5, also includes a pair of fastening pins 10b which are adapted to be inserted into a pair of basket-positioning slots 13a and 14a formed in a pair of basket-positioning slot plates 13 and 14, respectively. The basket-positioning slot plates 13 and 14, as shown in FIG. 3, are secured to a respective pair of side protection plates 7 and 6 by means of respective members 13b and 14b. As shown in FIGS. 5 and 6, the rear portion 8b of the tennis ball guide plate 8 is formed to be slightly inclined so as to cause the rear of the collecting basket 10 to be at a level slightly below the front of the basket. In this manner, tennis balls picked up and deposited in the collecting basket 10 tend to move from the front of the basket toward the rear of the basket and, therefore, are more readily contained therein.

The side protection plates 6 and 7, as shown most clearly in FIG. 3, are affixed to the side frames 20 (only one of which is visible in FIG. 3) in the spaces provided between the side frames 20 and the associated wheels 1 and 2. A repeller plate 9 is attached to the side protection plates 6 and 7 at an angle of approximately 30° with respect to a horizontal plane parallel to ground level, noting FIG. 6. A portion 9a (FIGS. 3, 6, and 7) of the repeller plate 9 is closely positioned near the top, rear portion of the helix reel assembly 3.

To facilitate the guiding of tennis balls lying on the ground into the tennis ball pickup and collecting machine of the invention, a pair of curved tennis ball bumpers 15 and 16 are provided such as shown in FIGS. 2, 4, and 5. A protective top cover plate 17, FIG. 2, is also provided for covering the top portion of the helix reel assembly 3 and the repeller plate 9. A handle 18, FIG. 2, is attached to the side frames 20 in the usual well-known manner (not shown in detail) for the purpose of imparting a forward motion to the tennis ball pickup and collecting machine.

The manner of operation of the tennis ball pickup and collecting machine of the invention can be readily understood by referring to FIG. 6. As shown in FIG. 6, when the tennis ball pickup and collecting machine is pushed in a forward direction, the wheels and the helix reel assembly 3 both turn in a counter-clockwise direction, the reel assembly 3, however, turning in the very well known manner much faster than the wheels. A tennis ball TB, having an initial position A, for example, in front of the helix assembly 3, is initially pushed up onto the front portion 8a of the tennis ball guide plate 8 by one of the blades 3a of the rotating helix heel assembly 3.

The helix reel assembly 3, as it continues to rotate, attempts to propel the tennis ball TB upwardly toward the repeller plate 9, as indicated by the vertical arrow B in FIG. 6. The tennis ball TB, however, is not propelled against the repeller plate 9 for the reason that, as the helix reel assembly 3 rapidly turns, air is pushed around the outside or periphery thereof and centrifugal forces are developed in a direction away from the reel assembly, the centrifugal forces acting against the tennis ball TB. The repeller plate 9, particularly the portion 9a, intercepts the path of this moving air and, because of the angular orientation of the portion 9a, redirects the air in a direction indicated by the arrow C. The redirected air strikes the tennis ball TB as it approaches the repeller plate 9 and causes the tennis ball TB to be directed away from the repeller plate 9 and into the collecting basket 10, the side of the basket 10 facing the front of the machine being open as indicated in FIG. 6. As is apparent from FIGS. 2, 3, or 5, the tennis ball TB is prevented from being thrown out of the machine, at the sides thereof, by the presence of the side protection plates 6 and 7. That is, the tennis ball is confined to the region in front of the open side of the basket 10.

It is to be appreciated that if no repeller plate 9 were used, the tennis ball TB in the discussion presented above may be picked up from the ground and carried by the helix reel assembly 3 nearly all the way around and dropped back onto the ground. Or, the tennis ball could block the helix reel assembly 3, particularly if a top cover plate such as shown at 17 in FIG. 2 is used.

I claim:

1. A tennis ball pickup and collecting machine for picking up tennis balls lying on a surface and for collecting said tennis balls, comprising:
    a modified lawn mower including:
        a pair of side frames;

an elongated member passing through the side frames and capable of rotation, said elongated member having a wheel secured at each end thereof, said wheels touching the surface;

a rotatable helix reel assembly postioned between the side frames and above the surface and including a plurality of helical blades, said helix reel assembly being positioned above the surface by an amount sufficient to enable a tennis ball present in front of the helix reel assembly to be pushed therebetween in response to the tennis ball being struck by one of the helical blades upon a rotation motion being imparted to the helix reel assembly;

a roller rotatably mounted at the ends thereof to the side frames and touching the surface at a point located behind the helix reel assembly; and means operative to cause said wheels and roller to move along the surface and to cause a rotation motion to be imparted to the helix reel assembly;

a tennis ball collecting means for collecting tennis balls and having an opening therein facing a rear portion of the helix reel assembly;

a tennis ball guide plate having a portion positioned near to the surface and between the helix reel assembly and the roller, and spaced from the helix reel assembly by an amount sufficient to enable a tennis ball to pass therebetween after being struck by one of the helical blades of the helix reel assembly, said tennis ball collecting means being located behind said portion of the tennis ball guide plate; and a repeller plate closely positioned near a top, rear portion of the helix reel assembly, said repeller plate being arranged with respect to the helix reel assembly to intercept the flow of air propelled around the helix reel assembly upon a rotation motion being imparted thereto and to redirect the air in a direction toward the opening in the tennis ball collecting means, whereby a tennis ball caused to pass between the aforesaid portion of the tennis ball guide plate and the helix reel assembly and caused to be propelled toward the repeller plate when the helix reel assembly is rotating is directed into the opening of the tennis ball collecting means by means of air redirected by the repeller plate into the path of the tennis ball.

2. A tenis ball pickup and collecting machine in accordance with claim 1 wherein the repeller plate includes a portion forming an angle of approximately 30° with respect to a horizontal plane parallel to the surface.

3. A tennis ball pickup and collecting machine in accordance with claim 2 wherein the tennis ball collecting means is a basket, and said tennis ball pickup and collecting machine further comprises:

a side protection plate secured to each of the side frames and extending in a rearward direction to a point just in front of the opening in the basket, said side protection plates confining tennis balls picked up from the surface to the region in front of the opening in the basket;

a top cover plate covering the repeller plate and the top portion of the helix reel assembly; and a pair of curved bumpers for guiding tennis balls lying on the surface into the front of the helix reel assembly.

References Cited

UNITED STATES PATENTS

| | | |
|---|---|---|
| 678,461 | 7/1901 | Egan. |
| 1,439,832 | 12/1922 | Merrill. |
| 2,551,427 | 5/1951 | Ellefson _____ 198—7 |

ALBERT J. MAKAY, Primary Examiner

U.S. Cl. X.R.

56—328